US 12,395,744 B2

(12) United States Patent
Lu et al.

(10) Patent No.: US 12,395,744 B2
(45) Date of Patent: Aug. 19, 2025

(54) SYSTEMS AND METHODS FOR CONTROLLING EXPOSURE TIME PERIODS FOR IMAGE ACQUISITION

(71) Applicant: ZHEJIANG DAHUA TECHNOLOGY CO., LTD., Zhejiang (CN)

(72) Inventors: Erli Lu, Hangzhou (CN); Lu Kuang, Hangzhou (CN)

(73) Assignee: ZHEJIANG DAHUA TECHNOLOGY CO., LTD., Hangzhou (CN)

( * ) Notice: Subject to any disclaimer, the term of this patent is extended or adjusted under 35 U.S.C. 154(b) by 244 days.

(21) Appl. No.: 18/324,385

(22) Filed: May 26, 2023

(65) Prior Publication Data

US 2023/0328388 A1  Oct. 12, 2023

Related U.S. Application Data

(63) Continuation of application No. PCT/CN2021/135001, filed on Dec. 2, 2021.

(30) Foreign Application Priority Data

Dec. 8, 2020  (CN) .......................... 202011444702.0

(51) Int. Cl.
*H04N 23/73* (2023.01)
*H04N 23/741* (2023.01)
*H04N 25/626* (2023.01)

(52) U.S. Cl.
CPC ........... *H04N 23/73* (2023.01); *H04N 23/741* (2023.01); *H04N 25/626* (2023.01)

(58) Field of Classification Search
CPC .... H04N 23/73; H04N 23/741; H04N 25/626; H04N 23/665; H04N 5/06; H04N 23/45; H04N 25/41; H04N 25/625
See application file for complete search history.

(56) References Cited

U.S. PATENT DOCUMENTS 10,277,841 B2  4/2019  Zhou et al.
11,463,628 B1*  10/2022  Aggarwal .............. H04N 23/45
(Continued)

FOREIGN PATENT DOCUMENTS

CN  101631202 A  1/2010
CN  105827964 A  8/2016
(Continued)

OTHER PUBLICATIONS

The Extended European Search Report in European Application No. 21902468.4 mailed on Mar. 20, 2024, 8 pages.
(Continued)

*Primary Examiner* — Sinh Tran
*Assistant Examiner* — Angel L Garces-Rivera
(74) *Attorney, Agent, or Firm* — Metis IP LLC

(57) ABSTRACT

A method for image acquisition may be provided. The method may include sending an exposure instruction to a plurality of image sensors. The method may further include controlling exposure time periods of at least one exposure group to obtain a plurality of frame images based on the exposure instruction. For each of the at least one exposure group, the exposure group may include a plurality of exposure regions corresponding to the plurality of image sensors, imaging positions corresponding to the plurality of exposure regions may be the same, and the exposure instruction may cause that a relationship between midpoints of exposure time periods of the plurality of exposure regions in the exposure group satisfies a condition.

15 Claims, 10 Drawing Sheets

(56) References Cited

U.S. PATENT DOCUMENTS

| | | |
|---|---|---|
| 2006/0170662 A1 | 8/2006 | Kurane |
| 2013/0222620 A1 | 8/2013 | Tatsuzawa et al. |
| 2015/0125032 A1 | 5/2015 | Yamanaka et al. |
| 2015/0334269 A1 | 11/2015 | Yokota et al. |
| 2017/0048441 A1 | 2/2017 | Deng et al. |
| 2018/0097984 A1 | 4/2018 | Kobayashi et al. |
| 2018/0323225 A1 | 11/2018 | Nakamura et al. |
| 2019/0297244 A1 | 9/2019 | Wu |
| 2020/0348580 A1 | 11/2020 | Pan et al. |
| 2021/0227116 A1 | 7/2021 | Kaizu |

FOREIGN PATENT DOCUMENTS

| | | |
|---|---|---|
| CN | 105991935 A | 10/2016 |
| CN | 109756681 A | 5/2019 |
| WO | 2022121761 A1 | 6/2022 |

OTHER PUBLICATIONS

First Office Action in Chinese Application No. 202011444702.0 mailed on Mar. 30, 2022, 11 pages.
International Search Report in PCT/CN2021/135001 mailed on Feb. 23, 2022, 4 pages.
Written Opinion in PCT/CN2021/135001 mailed on Feb. 23, 2022, 5 pages.

\* cited by examiner

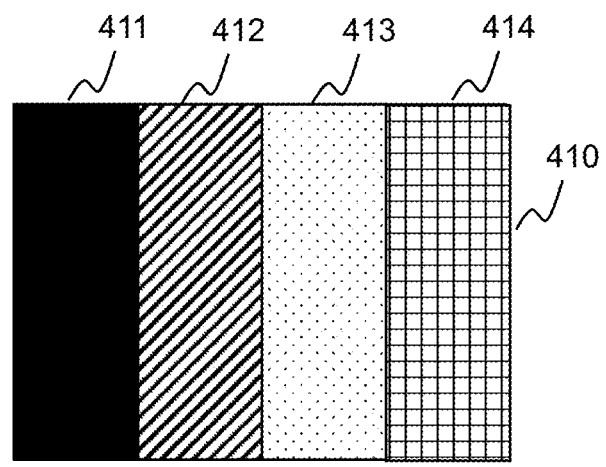
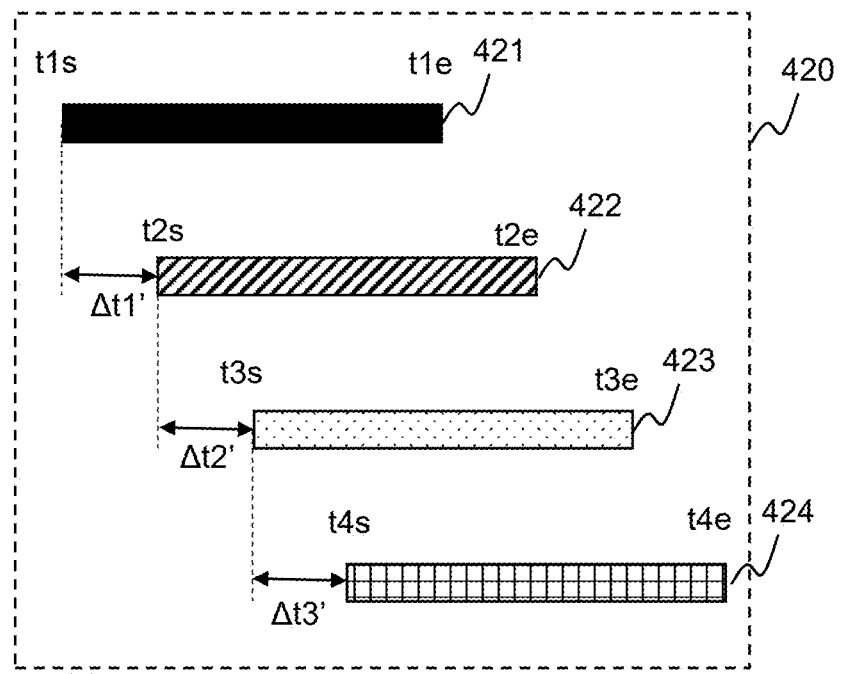
FIG. 4

700

```
┌─────────────────────────────────────────┐
│ Obtaining a first image captured by a first image │
│ sensor of a capture device and a second image    │ /710
│ captured by a second image sensor of the         │
│ capture device                                    │
└─────────────────────────────────────────┘
                      ↓
┌─────────────────────────────────────────┐
│ Determining a first exposure period based on      │ /720
│ the first image and a second exposure period      │
│ based on the second image                         │
└─────────────────────────────────────────┘
                      ↓
┌─────────────────────────────────────────┐
│ Generating a sensor synchronization signal        │ /730
│ based on the first exposure time period and the   │
│ second exposure time period                       │
└─────────────────────────────────────────┘
                      ↓
┌─────────────────────────────────────────┐
│ Adjusting the delay time of the first image       │
│ sensor and/or the delay time of the second        │
│ image sensor based on the sensor                  │
│ synchronization signal to obtain adjusted         │ /740
│ exposure time periods corresponding to the first  │
│ image sensor and the second image sensor, so      │
│ that the first image sensor and/or the second     │
│ image sensor may capture images based on          │
│ the adjusted exposure time periods                │
└─────────────────────────────────────────┘
```

SYSTEMS AND METHODS FOR CONTROLLING EXPOSURE TIME PERIODS FOR IMAGE ACQUISITION

CROSS-REFERENCE TO RELATED APPLICATIONS

This application is a continuation of International Application No. PCT/CN2021/135001, filed on Dec. 2, 2021, which claims priority to Chinese Application No. 202011444702.0 filed on Dec. 8, 2020, the entire contents of which are hereby incorporated by reference.

TECHNICAL FIELD

The present disclosure relates to imaging, and in particular, to systems and methods for image acquisition.

BACKGROUND

With the rapid development of digital camera technology, a high dynamic range image (HDRI) technique has been widely used. The HDRI technique may need to fuse images with different exposures to generate a fused image with a wide dynamic range. Due to differences in lengths of exposure time periods of different images, if there are moving objects in a surveillance scene, the fused image of the surveillance scene obtained by the HDRI technique may include obvious flare and/or ghosting, which has a poor quality. It is desirable to provide systems and methods for acquiring images with improved quality.

SUMMARY

According to an aspect of the present disclosure, a system for image acquisition may be provided. The system may include at least one storage device and at least one processor configured to communicate with the at least one storage device. The at least one storage device may include a set of instructions. When the at least one processor execute the set of instructions, the at least one processor may be directed to cause the system to perform one or more of the following operations. The system may send an exposure instruction to a plurality of image sensors. The system may further control exposure time periods of at least one exposure group to obtain a plurality of frame images based on the exposure instruction. For each of the at least one exposure group, the exposure group may include a plurality of exposure regions corresponding to the plurality of image sensors, imaging positions corresponding to the plurality of exposure regions may be the same, and the exposure instruction may cause that a relationship between midpoints of exposure time periods of the plurality of exposure regions in the exposure group satisfies a condition.

In some embodiments, the condition may be satisfied in response to a distance between the midpoints of exposure time periods of the plurality of exposure regions in the exposure group being smaller than or equal to a threshold.

In some embodiments, each of the plurality of exposure regions of the exposure group may cover a whole of an imaging region of an image sensor corresponding to the exposure region.

In some embodiments, each of the plurality of exposure regions of the exposure group may cover a portion of an imaging region of an image sensor corresponding to the exposure region.

In some embodiments, imaging positions corresponding to the at least one exposure group may cover a whole of the imaging region of the image sensor.

In some embodiments, delay time differences of a plurality of exposure time sequences corresponding to the plurality of image sensors may be the same. For each of the plurality of image sensors, an exposure time sequence corresponding to the image sensor may be determined based on an arrangement of exposure starting times of a plurality of exposure regions corresponding to the image sensor, and a delay time difference of the exposure time sequence may be determined based on a difference between two adjacent exposure starting times in the exposure time sequence corresponding to the image sensor.

In some embodiments, the at least one exposure group may be associated with a moving object.

In some embodiments, the system may further perform one or more of the following operations. The system may predict a position of the moving object in a target frame image based on a plurality of historical frame images. The target frame image may be generated based on the exposure instruction. The system may further determine the at least one exposure group based on the position of the moving object.

In some embodiments, the system may further perform one or more of the following operations. The system may obtain a reference total length of an exposure time period of a target image sensor of the plurality of image sensors. The system may further determine the at least one exposure group based on the reference total length of the exposure time period of the target image sensor.

According to another aspect of the present disclosure, a method for image acquisition may be provided. The method may include sending an exposure instruction to a plurality of image sensors. The method may further include controlling exposure time periods of at least one exposure group to obtain a plurality of frame images based on the exposure instruction. For each of the at least one exposure group, the exposure group may include a plurality of exposure regions corresponding to the plurality of image sensors, imaging positions corresponding to the plurality of exposure regions may be the same, and the exposure instruction may cause that a relationship between midpoints of exposure time periods of the plurality of exposure regions in the exposure group satisfies a condition.

According to yet another aspect of the present disclosure, a system for image acquisition may be provided. The system may include a sending module and a control module. The sending module may be configured to send an exposure instruction to a plurality of image sensors. The control module may be configured to control exposure time periods of at least one exposure group to obtain a plurality of frame images based on the exposure instruction. For each of the at least one exposure group, the exposure group may include a plurality of exposure regions corresponding to the plurality of image sensors, imaging positions corresponding to the plurality of exposure regions may be the same, and the exposure instruction may cause that a relationship between midpoints of exposure time periods of the plurality of exposure regions in the exposure group satisfies a condition.

According to yet another aspect of the present disclosure, a non-transitory computer readable medium may be provided. The non-transitory computer readable may include at least one set of instructions for image acquisition. When executed by one or more processors of a computing device, the at least one set of instructions may cause the computing device to perform a method. The method may include sending an exposure instruction to a plurality of image sensors. The method may further include controlling exposure time periods of at least one exposure group to obtain a plurality of frame images based on the exposure instruction. For each of the at least one exposure group, the exposure group may include a plurality of exposure regions corresponding to the plurality of image sensors, imaging positions corresponding to the plurality of exposure regions may be the same, and the exposure instruction may cause that a relationship between midpoints of exposure time periods of the plurality of exposure regions in the exposure group satisfies a condition.

Additional features will be set forth in part in the description which follows, and in part will become apparent to those skilled in the art upon examination of the following and the accompanying drawings or may be learned by production or operation of the examples. The features of the present disclosure may be realized and attained by practice or use of various aspects of the methodologies, instrumentalities, and combinations set forth in the detailed examples discussed below.

BRIEF DESCRIPTION OF THE DRAWINGS

The present disclosure is further described in terms of exemplary embodiments. These exemplary embodiments are described in detail with reference to the drawings. These embodiments are non-limiting exemplary embodiments, in which like reference numerals represent similar structures throughout the several views of the drawings, and wherein:

FIG. 4 is a schematic diagram illustrating an exemplary exposure time sequence and a delay time difference of the exposure time sequence according to some embodiments of the present disclosure;

FIG. 7 is a flowchart illustrating an exemplary process for image acquisition according to some embodiments of the present disclosure;

DETAILED DESCRIPTION

Figure 1:
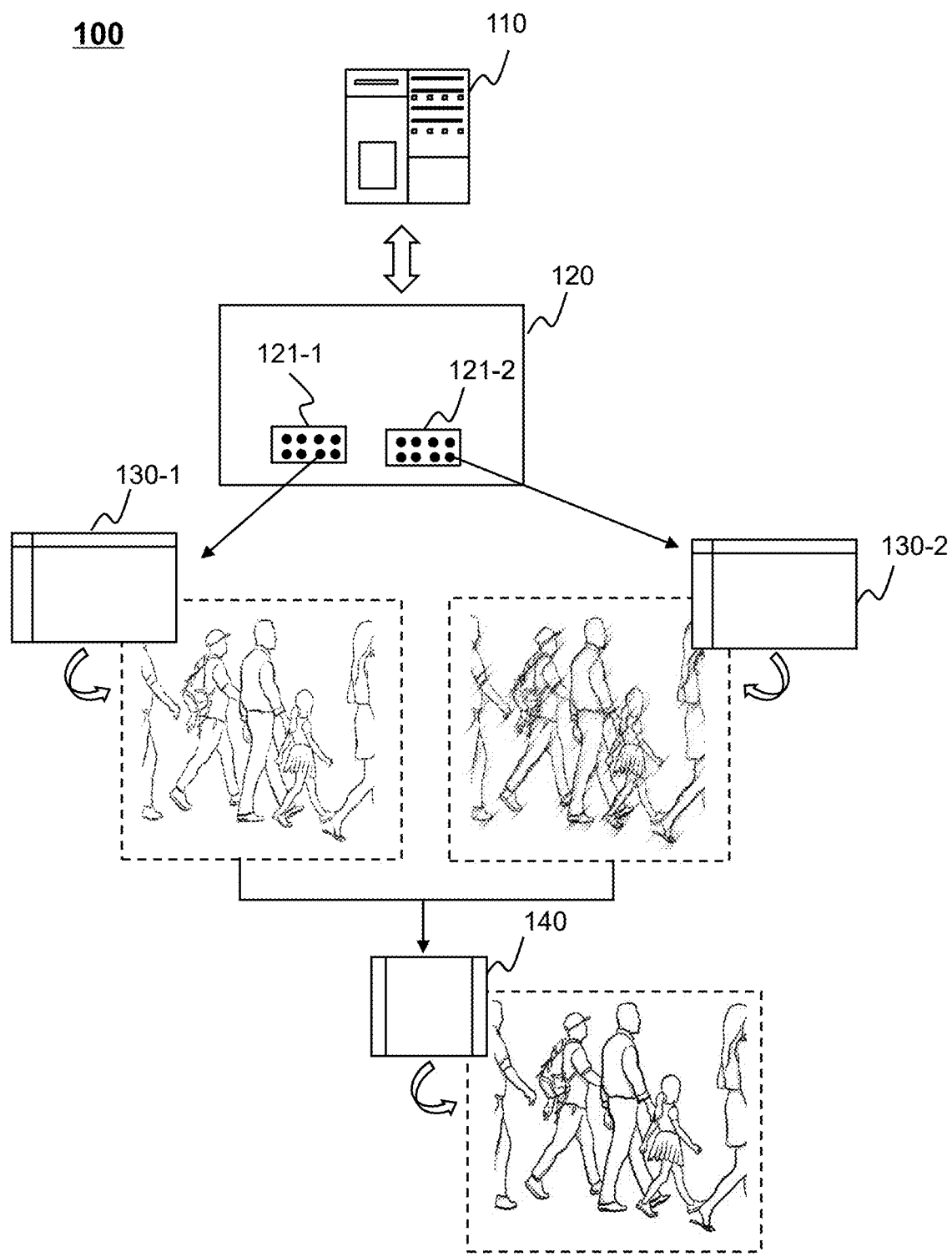
FIG. 1 is a schematic diagram illustrating an exemplary image acquisition system 100 according to some embodiments of the present disclosure.

In the following detailed description, numerous specific details are set forth by way of examples in order to provide a thorough understanding of the relevant disclosure. However, it should be apparent to those skilled in the art that the present disclosure may be practiced without such details. In other instances, well-known methods, procedures, systems, components, and/or circuitry have been described at a relatively high-level, without detail, in order to avoid unnecessarily obscuring aspects of the present disclosure. Various modifications to the disclosed embodiments will be readily apparent to those skilled in the art, and the general principles defined herein may be applied to other embodiments and applications without departing from the spirit and scope of the present disclosure. Thus, the present disclosure is not limited to the embodiments shown, but to be accorded the widest scope consistent with the claims.

It will be understood that the terms "system," "engine," "unit," "module," and/or "block" used herein are one method to distinguish different components, elements, parts, sections, or assemblies of different levels in ascending order. However, the terms may be displaced by other expressions if they may achieve the same purpose.

Generally, the words "module," "unit," or "block" used herein, refer to logic embodied in hardware or firmware, or to a collection of software instructions. A module, a unit, or a block described herein may be implemented as software and/or hardware and may be stored in any type of non-transitory computer-readable medium or other storage devices. In some embodiments, a software module/unit/block may be compiled and linked into an executable program. It will be appreciated that software modules can be callable from other modules/units/blocks or from themselves, and/or may be invoked in response to detected events or interrupts. Software modules/units/blocks configured for execution on computing devices (e.g., processor 220 illustrated in FIG. 2) may be provided on a computer-readable medium, such as a compact disc, a digital video disc, a flash drive, a magnetic disc, or any other tangible medium, or as a digital download (and can be originally stored in a compressed or installable format that needs installation, decompression, or decryption prior to execution). Such software code may be stored, partially or fully, on a storage device of the executing computing device, for execution by the computing device. Software instructions may be embedded in firmware, such as an EPROM. It will be further appreciated that hardware modules (or units or blocks) may be included in connected logic components, such as gates and flip-flops, and/or can be included in programmable units, such as programmable gate arrays or processors. The modules (or units or blocks) or computing device functionality described herein may be implemented as software modules (or units or blocks), but may be represented in hardware or firmware. In general, the modules (or units or blocks) described herein refer to logical modules (or units or blocks) that may be combined with other modules (or units or blocks) or divided into sub-modules (or sub-units or sub-blocks) despite their physical organization or storage.

It will be understood that when a unit, an engine, a module, or a block is referred to as being "on," "connected to," or "coupled to" another unit, engine, module, or block, it may be directly on, connected or coupled to, or communicate with the other unit, engine, module, or block, or an intervening unit, engine, module, or block may be present, unless the context clearly indicates otherwise. As used herein, the term "and/or" includes any and all combinations of one or more of the associated listed items.

The terminology used herein is for the purposes of describing particular examples and embodiments only and is not intended to be limiting. As used herein, the singular forms "a," "an," and "the" may be intended to include the plural forms as well, unless the context clearly indicates otherwise. It will be further understood that the terms "include" and/or "comprise," when used in this disclosure, specify the presence of integers, devices, behaviors, stated features, steps, elements, operations, and/or components, but do not exclude the presence or addition of one or more other integers, devices, behaviors, features, steps, elements, operations, components, and/or groups thereof.

In addition, it should be understood that in the description of the present disclosure, the terms "first", "second", or the like, are only used for the purpose of differentiation, and cannot be interpreted as indicating or implying relative importance, nor can be understood as indicating or implying the order.

The flowcharts used in the present disclosure illustrate operations that systems implement according to some embodiments of the present disclosure. It is to be expressly understood, the operations of the flowcharts may be implemented not in order. Conversely, the operations may be implemented in an inverted order, or simultaneously. Moreover, one or more other operations may be added to the flowcharts. One or more operations may be removed from the flowcharts.

As used in the present disclosure, terms "frame image" and "frame" can be used interchangeably, indicating an image of a video stream.

FIG. 1 is a schematic diagram illustrating an exemplary image acquisition system 100 according to some embodiments of the present disclosure.

As shown in FIG. 1, the image acquisition system 100 may include a processing device 110 and a capture device 120.

The capture device 120 may be configured to acquire video data and/or image data. In some embodiments, the capture device 120 may include a plurality of capture components each of which can acquire video data or image data. For example, the capture device 120 may include a plurality of sub-cameras that can capture videos simultaneously. In some embodiments, the capture device 120 may include a camera. Exemplary camera may include a gun camera, a dome camera, an integrated camera, a monocular camera, a binocular camera, a multi-view camera, or the like, or any combination thereof.

The capture device 120 may continuously or periodically acquire video data or image data. Alternatively, the capture device 120 may acquire video data and/or image data based on a control instruction. The acquired video data and/or image data may be stored in a local storage device, or sent to an external storage device via a network.

In some embodiments, the capture device 120 may include a plurality of image sensors (also referred as to photosensitive chips). For example, as shown in FIG. 1, the capture device 120 may include an image sensor 121-1 and an image sensor 121-2. In some embodiments, the plurality of image sensors may be disposed inside a same capture device. Alternatively, the plurality of image sensors may be disposed inside different capture sub-devices, respectively. Exemplary image sensors may include a charge coupled device (CCD) image sensor, a complementary metal oxide semiconductor (CMOS) image sensor, a near infrared image sensor, or the like, or any combination thereof. After an image sensor is irradiated by light, an electrical signal may be generated via the image sensor, and then an image may be generated based on the generated electrical signal. It can be considered that an image sensor is composed of a large count of photosensitive units each of which corresponds to one pixel.

In some embodiments, lengths of exposure time periods of the plurality of image sensors may be different. More descriptions for the length of an exposure time period may be found elsewhere in the present disclosure (e.g., FIG. 2 and the descriptions thereof). For example, the processing device 110 may set different sensitivities for the plurality of image sensors, so that lengths of exposure time periods of the plurality of image sensors may be different. The lower the sensitivity is, the longer the exposure time period may be.

In some embodiments, the plurality of image sensors may be configured to photograph a same scene to acquire multiple frame images of the scene with different lengths of exposure time periods. The multiple frame images with different lengths of exposure time periods may be fused to generate an image of the scene with a high dynamic range. The scene refers to an object that needs to be photographed. For example, lengths of exposure time periods of the image sensors 121-1 and 121-2 may be different. As a further example, the length of the exposure time period of the image sensor 121-1 may be greater than the length of the exposure time period of the image sensor 121-2. The image sensor 121-1 may generate a frame image 130-1 and the image sensor 121-2 may generate a frame image 130-2. The frame image 130-1 and the frame image 130-2 may be fused to generate an image 140 with a high dynamic range.

In some embodiments, the processing device 110 may process information and/or data to perform one or more functions described in the present disclosure. For example, the processing device 110 may control the capture device 120 to acquire video data and/or image data by sending an instruction to the capture device 120. In some embodiments, the processing device 110 may be disposed into the capture device 120. Alternatively, the processing device 110 and the capture device 120 may be disposed separately.

In some embodiments, the processing device 110 may include a controller and a calculator. In some embodiments, the processing device 110 (e.g., the controller of the processing device 110) may send an exposure instruction to the image sensors 121-1 and 121-2 disposed in the capture device 120, so as to control exposure time periods of at least one exposure group of the capture device 120 based on the exposure instruction. For example, the processing device 110 may control that a relationship between midpoints of exposure time periods of the plurality of exposure regions in each exposure group satisfies a condition through the exposure instruction, so that ghosting in the fused image 140 is not concentrated. In some embodiments, the processing device 110 (e.g., the calculator of the processing device 110)

may determine exposure time periods of current frame images generated by image sensors 121-1 and 121-2 based on the exposure time periods of previous frame images generated by image sensors 121-1 and 121-2.

In some embodiments, the processing device 110 may include a sending module, a control module, and a determination module.

The sending module may be configured to send an exposure instruction to a plurality of image sensors.

The control module may be configured to control exposure time periods of at least one exposure group to obtain a plurality of frame images based on the exposure instruction. In some embodiments, the control module may and control the exposure time periods of at least one exposure group based on the exposure instruction. For example, the control module may control that the relationship between midpoints of exposure time periods of the plurality of exposure regions in each of the at least one exposure group satisfies a condition through the exposure instruction. Each exposure group may include a plurality of exposure regions corresponding to the plurality of image sensors. Imaging positions corresponding to the plurality of exposure regions may be the same.

In some embodiments, each of the plurality of exposure regions of an exposure group may cover a whole or a portion of an imaging region of an image sensor corresponding to the exposure region. For example, the exposure group may be associated with a moving object.

The determination module may be configured to determine the at least one exposure group. For example, the determination module may predict a position of the moving object in a target frame image based on a plurality of historical frame images. Further, the determination module may determine the at least one exposure group based on the position of the moving object. As another example, the determination module may obtain a reference total length of an exposure time period of a target image sensor of the plurality of image sensors. Further, the determination module may determine the at least one exposure group based on the reference total length of the exposure time period of the target image sensor.

More descriptions for the control module and the determination module may be found elsewhere in the present disclosure. See, e.g., FIGS. 2-6 and relevant descriptions thereof.

It should be noted that the above description is merely provided for the purposes of illustration, and not intended to limit the scope of the present disclosure. For persons having ordinary skills in the art, multiple variations and modifications may be made under the teachings of the present disclosure. However, those variations and modifications do not depart from the scope of the present disclosure. In some embodiments, the control module and the determination module may be integrated into one module, and any one of the modules may be divided into two or more units. In some embodiments, the processing device 110 may include one or more additional modules, such as a storage module (not shown) for storing data.

Figure 2A:
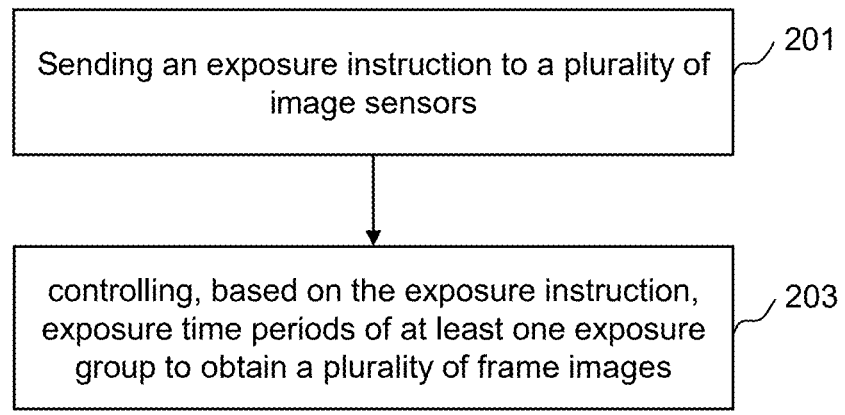
FIG. 2A is a flowchart illustrating an exemplary process for image acquisition according to some embodiments of the present disclosure.

FIG. 2A is a flowchart illustrating an exemplary process for image acquisition according to some embodiments of the present disclosure. In some embodiments, the process 200 may be executed by the image acquisition system 100. For example, the process 200 may be implemented as a set of instructions (e.g., an application) stored in a storage device. The operations of the illustrated process presented below are intended to be illustrative. In some embodiments, the process 200 may be accomplished with one or more additional operations not described and/or without one or more of the operations discussed. Additionally, the order of the operations of process 200 illustrated in FIG. 2 and described below is not intended to be limiting.

In 201, the processing device 110 may send an exposure instruction to a plurality of image sensors.

In 203, the processing device 110 may control, based on the exposure instruction, exposure time periods of at least one exposure group to obtain a plurality of frame images.

In some embodiments, for each of the at least one exposure group, the exposure group may include a plurality of exposure regions corresponding to the plurality of image sensors, and imaging positions corresponding to the plurality of exposure regions may be the same. The exposure instruction may cause that a relationship between midpoints of exposure time periods of the plurality of exposure regions in the exposure group satisfies a condition.

In some embodiments, an image sensor may include a large count of photosensitive units each of which corresponds to one pixel as described in FIG. 1. A whole of an imaging region of an image sensor refers to a region composed of all photosensitive units in the image sensor. A portion of the imaging region of the image sensor refers to a region composed of a part of photosensitive units in the image sensor.

In some embodiments, the capture device 120 may perform imaging using one or more exposure modes. For example, the one or more exposure modes may include a global exposure mode, a partial exposure mode, etc. Using the global exposure mode, all photosensitive units in the image sensor are exposed simultaneously. Using the partial exposure mode, all photosensitive units in the image sensor are not exposed simultaneously. The partial exposure mode may include different modes according to a location of exposure. For example, the partial exposure mode may include a row exposure mode, a column exposure mode, or the like. Using the row exposure mode, photosensitive units on a same row in the image sensor are exposed simultaneously, and exposure starting times of photosensitive units in different rows are different. Using the column exposure mode, photosensitive units on a same column in the image sensor are exposed simultaneously, and exposure starting times of photosensitive units in different columns are different.

The descriptions in FIGS. 2B through 6 are provided, unless otherwise stated expressively, with reference to the row exposure mode for illustration purposes and not intended to be limiting.

In some embodiments, an exposure region corresponding to an image sensor may be a position that the image sensor is exposed each time, that is, the exposure region corresponding to an image sensor may be a position that is exposed each time in an imaging region of the image sensor. If the exposure mode is a global exposure mode, an exposure of a whole of an imaging region of the image sensor may be achieved with one exposure. In this case, the image sensor may correspond to only one exposure region, and the exposure region may be the whole of the imaging region of the image sensor. If the exposure mode is a partial exposure mode, the exposure of the whole of the imaging region of the image sensor may be achieved with a plurality of exposures. In this case, the image sensor may correspond to a plurality of exposure regions, and each of the plurality of exposure regions may be a portion of the imaging region of the image sensor. For example, the image sensor may include multiple rows of photosensitive units. During row exposure, multiple exposure regions corresponding to the image sensor may be multiple rows of photosensitive units on the image sensor, and each of the multiple In some embodiments, an exposure group may include exposure regions corresponding to the plurality of image sensors. Each of the exposure regions in the exposure group may corresponds to one of the plurality of image sensors. In some embodiments, the imaging positions corresponding to the exposure regions of the plurality of image sensors in the exposure group may be the same. An imaging position refers to a position corresponding to one or more photosensitive units in the imaging region of an image sensor. For example, taking the row exposure mode as an example, an exposure region of an exposure group may be a row of photosensitive units (e.g., the 5th row of photosensitive units) of an image sensor.

In some embodiments, for each of the at least one exposure group, each of the plurality of exposure regions of the exposure group may cover a whole or a portion of an imaging region of an image sensor corresponding to the exposure region. For example, if the exposure mode is a global exposure mode, the count of exposure groups composed of all exposure regions corresponding to the plurality of image sensors may be one, that is, the at least one exposure group may include one exposure group. In this case, each of the plurality of exposure regions of the exposure group may cover a whole of an imaging region of an image sensor corresponding to the exposure region. As another example, if the exposure mode is a partial exposure mode, the count of exposure groups composed of all exposure regions corresponding to the plurality of image sensors may correspond to count of exposures, and the at least one exposure group may include a plurality of exposure groups. In this case, for each of the plurality of exposure groups, each of the plurality of exposure regions of the exposure group may cover a portion of an imaging region of an image sensor corresponding to the exposure region.

In some embodiments, a length of an exposure time period refers to the duration it takes to expose an imaging position corresponding to an exposure region. Each exposure region may correspond to one length of exposure time period. In some embodiments, the lengths of the exposure time periods corresponding to exposure regions corresponding to a same image sensor may be the same.

In some embodiments, an exposure time period refers to an interval between a starting time and an ending time of exposing an imaging position corresponding to an exposure region. Each exposure region may correspond to one exposure time period. Exposure time periods of a plurality of exposure regions corresponding to an image sensor may be different.

In some embodiments, the exposure instruction refers to an instruction generated by the processing device 110 (e.g., a controller or a control module of the processing device 110) for controlling imaging of an image sensor. The exposure instruction may be configured to control exposure parameters. In some embodiments, the exposure instruction may control the exposure time periods of at least one exposure group.

In some embodiments, the exposure instruction may control the at least one exposure group so that exposure starting times and/or exposure ending times of the exposure time periods of the at least one exposure group satisfy requirements. For example, the exposure instruction may cause that the exposure starting times and the exposure ending times of a shorter exposure time period of an exposure group may be within a longer exposure time period of the exposure group. The exposure instruction may be implemented in various manners, such as setting the exposure starting time of each exposure time period, or a delay time between the exposure time periods.

In some embodiments, the exposure instruction may cause that a relationship between midpoints of exposure time periods of the plurality of exposure regions in an exposure group satisfies a condition. For example, a time difference between midpoints of two of exposure time periods of the plurality of exposure regions in the exposure group may be controlled to be greater than a preset value, so that images acquired by the plurality of image sensors may cover a relatively wide time range.

In some embodiments, the condition may be satisfied in response to a distance between the midpoints of exposure time periods of the plurality of exposure regions in the exposure group being smaller than or equal to a threshold (e.g., 0 milliseconds, 0.001 milliseconds, etc.).

In some embodiments, if the relationship between midpoints of exposure time periods of the plurality of exposure regions in an exposure group satisfies the condition, the exposure group may be referred to as a target exposure group.

In some embodiments, each of the plurality of exposure regions of the target exposure group may cover a whole of an imaging region of an image sensor corresponding to the target exposure region. For example, if the exposure mode is a global exposure mode, the at least one exposure group may include one exposure group, and the relationship between midpoints of exposure time periods of the plurality of exposure regions in the exposure group satisfies the condition. If the exposure mode is a partial exposure mode, the at least one exposure group may include a plurality of exposure groups, and the relationship between midpoints of exposure time periods of the plurality of exposure regions in one or more of the plurality of exposure groups satisfies the condition, that is, the plurality of exposure groups may include one or more target exposure groups.

In some embodiments, imaging positions corresponding to the target exposure group may cover a portion of an imaging region of an image sensor.

In some embodiments, the scene captured by the plurality of image sensors may include a moving object. In some embodiments, the target exposure group may be associated with the moving object.

The processing device 110 may determine an exposure group associated with the moving object in a various manner. For example, the processing device 110 may obtain a designated exposure group based on a user setting. In some embodiments, the processing device 110 may predict a position of the moving object in a frame image acquired based on the exposure instruction, and determine whether the exposure group is associated with the moving object based on the predicted position of the moving object. More descriptions for the predicting of the position of the moving object may be found elsewhere in the present disclosure (e.g., FIG. 5 and the descriptions thereof).

In some embodiments, the target exposure group may be associated with a reference total length of an exposure time period of a target image sensor of the plurality of image sensors. More descriptions for the determining of whether the target exposure group is associated with a reference total length of an exposure time period of a target image sensor may be found elsewhere in the present disclosure (e.g., FIG. 6 and the descriptions thereof).

In some embodiments, the processing device 110 may obtain the plurality of frame images based on the exposure time periods of at least one exposure group. For example, the processing device 110 may cause each of the plurality of sensors to obtain one of the plurality of frame images based on the exposure time period corresponding to the image sensor. In some embodiments, the processing device 110 may fuse the plurality of frame images to generate a fused image.

Figure 2B:
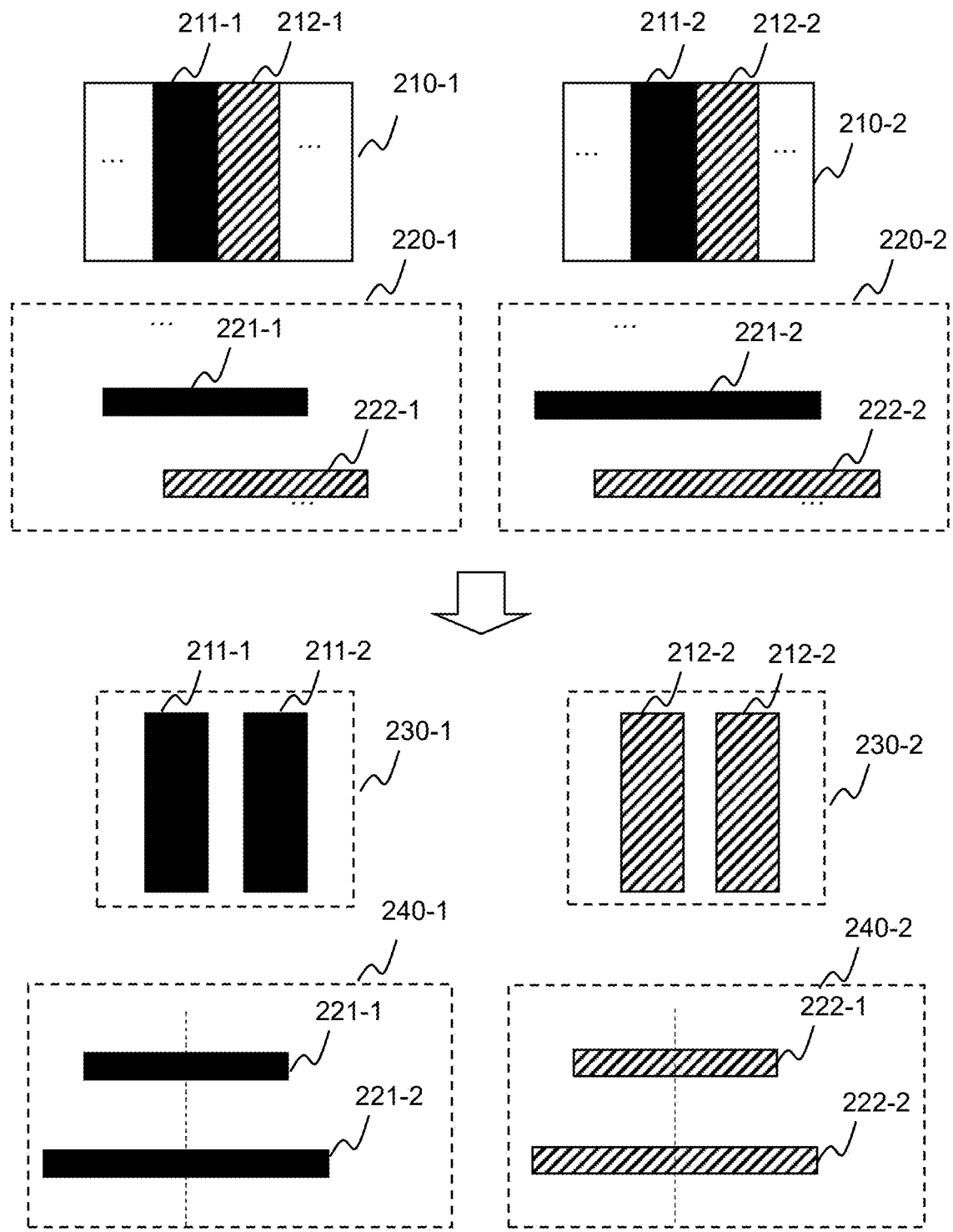
FIG. 2B is a schematic diagram illustrating an exemplary process for image acquisition according to some embodiments of the present disclosure.

For example, FIG. 2B is a schematic diagram illustrating an exemplary process for image acquisition according to some embodiments of the present disclosure. As shown in FIG. 2B, the exposure mode of each of image sensors 210-1 and 210-2 may be a row exposure mode. A rectangular block (e.g., a rectangular block 211-1) as shown in FIG. 2B may represent a row.

A row 211-1 represents a row of the Nth exposure of the image sensor 210-1, a row 211-2 represents a row of the Nth exposure of the image sensor 210-2, a row 212-1 represents a row of the (N+1)th exposure of the image sensor 210-1, and a row 212-2 represents a row of the (N+1)th exposure of the image sensor 210-2.

M exposure regions 220-1 corresponding to the image sensor 210-1 may include rows of the first exposure to the (N−1)th exposure of the image sensor 210-1 (not shown), the row 211-1 of the Nth exposure of the image sensor 210-1, the row 212-1 of the (N+1)th exposure of the image sensor 210-1, and rows of from the (N+2)th exposure to the mth exposure of the image sensor 210-1 (not shown). M exposure regions 220-2 corresponding to the image sensor 210-2 may include rows of the first exposure to the (N−1)th exposure of the image sensor 210-2 (not shown), the row 211-2 of the Nth exposure of the image sensor 210-2, the row 212-2 of the (N+1)th exposure of the image sensor 210-2, and rows of from the (N+2)th exposure to the mth exposure of the image sensor 210-2 (not shown).

Each exposure region corresponding to the image sensor 210-1 may correspond to one exposure time period, and the M exposure regions 220-1 corresponding to the image sensor 210-1 may correspond to M exposure time periods. For example, the row 211-1 of the Nth exposure of the image sensor 210-1 may correspond to an exposure time period 221-1, and the row 212-1 of the (N+1)th exposure of the image sensor 210-1 may correspond to an exposure time period 222-1. Similarly, the M exposure regions 220-2 corresponding to the image sensor 210-2 may correspond to M exposure time periods. For example, the row 211-2 of the Nth exposure of the image sensor 210-2 may correspond to an exposure time period 221-2, and the row 212-2 of the (N+1)th exposure of the image sensor 210-2 may correspond to an exposure time period 222-2.

All exposure regions corresponding to the image sensors 210-1 and 210-2 may compose M exposure groups. Each of the M exposure groups may include one exposure region of the image sensor 210-1 and one exposure region of the image sensor 210-2, and imaging positions corresponding to the exposure region of the image sensor 210-1 and the exposure region of the image sensor 210-2 in the exposure group are the same. For example, the M exposure groups may include an exposure group 230-1 and an exposure group 230-2. In the exposure group 230-1, the row 211-1 may correspond to the Nth row of the image sensor 210-1, and the row 211-2 may correspond to the Nth row of the image sensor 210-2. In the exposure group 230-2, the row 212-1 may correspond to the (N+1)th row of the image sensor 210-1, and the row 212-2 may correspond to the (N+1)th row of the image sensor 210-2.

Each of the M exposure groups may corresponds to multiple exposure time periods. For example, among multiple exposure time periods 240-1 corresponding to the exposure group 230-1, the exposure time period 221-1 may correspond to the row 211-1 in the exposure group 230-1, and the exposure time period 221-2 may correspond to the row 211-2 in exposure group 230-1. Similarly, among multiple exposure time periods 240-2 corresponding to the exposure group 230-2, the exposure time period 222-1 may correspond to the exposure region 212-1 in the exposure group 230-2, and the time period 222-2 may correspond to the exposure region 212-2 in the exposure group 230-1.

After the plurality of image sensors receive the exposure instruction, exposure starting times of the rows 211-2 and 212-2 in the exposure group 230-1 and the exposure group 230-2 may be adjusted, that is, exposure starting times of the rows 211-2 and/or 212-2 of the image sensor 210-2 may be adjusted. Alternatively, the exposure instruction may be also configured to adjust the exposure starting time of the row of the image sensor 210-1. More descriptions for the adjusting the exposure starting time of a raw of an image sensor may be found elsewhere in the present disclosure (e.g., FIG. 4 and the descriptions thereof). The exposure instruction may cause that midpoints of the exposure time periods 221-1 and 221-2 in the multiple exposure time periods 240-1 coincide, that is, the distance between the midpoints of the exposure time periods 221-1 and 221-2 in the multiple exposure time periods 240-1 is zero, and the midpoints of the exposure time periods 222-1 and 222-2 in the multiple exposure time periods 240-2 may also coincide.

According to some embodiments of the present disclosure, the exposure instruction may cause that the relationship between midpoints of exposure time periods of the plurality of exposure regions in the each exposure group satisfies a condition, so that the ghosting can be evenly distributed on different sides of the moving object, rather than concentrated on one side of the moving object, thereby improving the quality of the generated high dynamic range image.

It should be noted that the above description is merely provided for the purposes of illustration, and not intended to limit the scope of the present disclosure. For persons having ordinary skills in the art, multiple variations and modifications may be made under the teachings of the present disclosure. However, those variations and modifications do not depart from the scope of the present disclosure.

Figure 3:
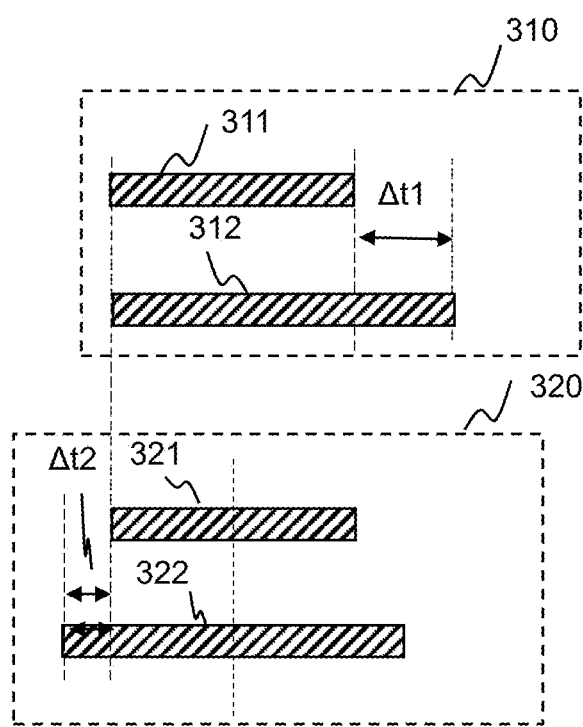
FIG. 3 is a schematic diagram for controlling exposure time periods of an exposure group to satisfy a condition according to some embodiments of the present disclosure.

FIG. 3 is a schematic diagram for controlling exposure time periods of an exposure group to satisfy a condition according to some embodiments of the present disclosure.

In some embodiments, the control module of the processing device 110 may cause that midpoints of the exposure time periods of the exposure group satisfy the condition in various manners. For example, taking that the midpoints between the exposure time periods of the exposure group coincide as an example, the control module may determine one of a plurality of image sensors as a reference image sensor. Further, the control module may adjust the exposure time periods corresponding to other image sensors in the exposure group, so as to cause that midpoints of the exposure time periods corresponding to other image sensors coincide with the midpoint of the exposure time period corresponding to the reference image sensor, that is, the midpoints of the exposure time periods corresponding to other image sensors and the midpoint of the exposure time period corresponding to the reference image sensor are a same time point.

As shown in FIG. 3, when the plurality of image sensors acquire the nth frame image of a video based on historical exposure instructions, an exposure region 1 corresponding to the image sensor 1 may be exposed during an exposure time period 311, and an exposure region 2 corresponding to the image sensor 2 may be exposed during an exposure time period 312. The exposure region 1 and the exposure region 2 may correspond to a same imaging position. The exposure time period 311 and the exposure time period 312 may have a same exposure starting time.

When the capture device 110 acquire the nth frame image of the video, an exposure group 1 may include the exposure region 1 and the exposure region 2, exposure time periods 310 of the exposure group 1 may include the exposure time period 311 and exposure time period 312.

When the capture device 110 acquire the (n+1)th frame image of the video, the control module may determine the image sensor 1 as a reference image sensor, and adjust the exposure time period 312 of the exposure region 2 corresponding to the image sensor 2, so that midpoints of the exposure time periods of the exposure region 1 and the exposure region 2 satisfy the condition. The following descriptions are provided, unless otherwise stated expressively, with reference to the case that the midpoints of the exposure time periods of the exposure region 1 and the exposure region 2 coincide, for illustration purposes and not intended to be limiting.

For example, a length of the exposure time period 311 may be t1, a length of the exposure time period 312 may be t2, t1 may be smaller than t2, and an absolute value of a time difference between t1 and t2 may be $\Delta t1$. When the (n+1)th frame image is acquired, the control module may cause that the exposure time period of the exposure area 1 is an exposure time period 321, the exposure time period of the exposure area 2 is an exposure time period 322, and the exposure starting time of the exposure time period 322 is earlier than the exposure starting time of the exposure time period 321 by $\Delta t2$ which is equal to $\Delta t1/2$ based on the exposure instruction. When the (n+1)th frame image is acquired, the midpoints of the exposure time periods 321 and 322 in the multiple exposure time periods 320 of the exposure group 1 coincide or the same.

In some embodiments, the adjustment strategy of the exposure time periods may be determined according to, such as the selection of a reference image sensor, the relationship between the lengths of exposure time periods corresponding to the plurality of image sensors, or the like. The control module may determine the adjustment manner when the (n+1)th frame image is acquired according to an actual need, so that the midpoints of the exposure time periods corresponding to the exposure groups coincide. For example, if the image sensor 2 is determined as a reference image sensor, the adjustment strategy may be that the exposure starting time of the exposure time period 321 is delayed by $\Delta t2$ from the exposure starting time of the exposure time period 322.

In some embodiments, if the exposure starting times of the exposure time periods 310 are different, the adjustment strategy may be determined according to a time difference between the exposure starting times of the exposure time periods 311 and 312, so that the midpoints of the exposure time periods corresponding to the exposure group coincide. For example, if the image sensor 1 is determined as the reference image sensor, the exposure starting time of the exposure time period 311 is delayed by $\Delta t3$ from the exposure starting time of the exposure time period 312, when the (n+1)th frame image is acquired, the exposure starting time of the exposure region 2 in the image sensor 2 may be earlier than the exposure starting time of the exposure region 1 in the image sensor 1 by ($\Delta t2 - \Delta t3$).

In some embodiments, delay time differences corresponding to the plurality of image sensors may be the same. For example, model numbers and parameters of the plurality of image sensors may be the same. The exposure instruction may only set time differences between exposure starting times corresponding to the plurality of image sensors, so that imaging positions corresponding to the target exposure group may cover the whole of imaging region of each of the plurality of image sensors. For example, the exposure instruction may include a time length that the exposure starting time of other sensors is delayed or earlier than the exposure starting time of the reference image sensor. More descriptions for the delay time difference may be found elsewhere in the present disclosure (e.g., FIG. 4 and the descriptions thereof).

In some embodiments, if the delay time differences corresponding to the plurality of image sensors are different, the adjustment strategy of the exposure time periods may be determined for each exposure group, so that the imaging positions corresponding to the target exposure group may cover a whole of imaging region of each of the plurality of image sensor.

More descriptions for the controlling of that a relationship between midpoints of exposure time periods corresponding to an exposure group satisfies a condition may be found elsewhere in the present disclosure (e.g., FIGS. 7-12 and the descriptions thereof).

It should be noted that the above description is merely provided for the purposes of illustration, and not intended to limit the scope of the present disclosure. For persons having ordinary skills in the art, multiple variations and modifications may be made under the teachings of the present disclosure. However, those variations and modifications do not depart from the scope of the present disclosure.

FIG. 4 is a schematic diagram illustrating an exemplary exposure time sequence and a delay time difference of the exposure time sequence according to some embodiments of the present disclosure.

As described in FIG. 2B, each of the plurality of image sensors may correspond to one or more exposure regions, the image sensor may correspond to one or more exposure time periods, and each of the one or more exposure time periods may correspond to one of the one or more exposure regions. More descriptions for the exposure time periods may be found elsewhere in the present disclosure (e.g., FIG. 2 and the descriptions thereof). If an image sensor corresponds to multiple exposure regions, an exposure time sequence of the image sensor may be determined based on the multiple exposure time periods.

In some embodiments, an exposure time sequence corresponding to an image sensor refers to a sequence obtained by arranging a plurality of exposure time periods corresponding to the image sensor according to a preset rule. In some embodiments, the exposure time sequence corresponding to the image sensor may be determined based on an arrangement of exposure starting times of the plurality of exposure regions corresponding to the image sensor.

In some embodiments, a delay time difference of an image sensor may refer to a delay between exposure starting times corresponding to two adjacent imaging positions of the image sensor. The delay time differences of different image sensors may be the same or different.

In some embodiments, a delay time difference of an image sensor may be determined based on one or more differences each of which is between two adjacent exposure starting times in the exposure time sequence corresponding to the image sensor. As user herein, a difference between two adjacent exposure starting times in an exposure time sequence may be referred to as a sub-delay time difference. The delay time difference of an image sensor may be determined based on one or more sub-delay time differences. For example, if all sub-delay time differences in the exposure time sequence are the same, the control module may directly determine the same sub-delay time difference as the delay time difference of the image sensor. As another example, the control module may perform operations (e.g., average, etc.) on all or part of the sub-delay time differences in the exposure time sequence to determine the delay time difference of the image sensor. As another example, if at least two of the sub-delay time differences in the exposure time sequence are different, the control module may designate an average of the sub-delay time differences in the exposure time sequence as the delay time difference of the image sensor.

For example, as shown in FIG. 4, the exposure mode of the image sensor 410 is a row exposure mode, and a row 411, a row 412, a row 413, and a row 414 are sequentially exposed. An exposure time period of the row 411 is 421, the exposure time period of the row 412 is 422, the exposure time period of the row 413 is 423, and the exposure time period of the row 414 is 424. Exposure regions of the image sensor 410 may include the row 411, the row 412, the row 413, and the row 414. The row 411, the row 412, the row 413, and the row 414 may be members of different exposure groups corresponding to the image sensor 410.

The image sensor 410 may correspond to an exposure time sequence 410. The exposure time sequence 410 may be arranged in the order of the exposure starting times of the exposure time periods 421, 422, 423, and 423 from early to late. A difference between exposure starting times (i.e., a sub-delay time difference) of two adjacent exposure time periods 421 and 422 is $\Delta t1'$, a difference between exposure starting times (i.e., a sub-delay time difference) of two adjacent exposure time periods 422 and 423 is $\Delta t2'$. If $\Delta t1'$ and $\Delta t2'$ are the same and the delay time difference of the image sensor 410 is $\Delta t$, At may be $\Delta t1'$ or $\Delta t2'$. If $\Delta t1'$ and $\Delta t2'$ are different, the exposure time difference $\Delta t$ of the image sensor 410 may be the average value of $\Delta t1'$ and $\Delta t2'$.

It should be noted that the above description is merely provided for the purposes of illustration, and not intended to limit the scope of the present disclosure. For persons having ordinary skills in the art, multiple variations and modifications may be made under the teachings of the present disclosure. However, those variations and modifications do not depart from the scope of the present disclosure.

Figure 5:
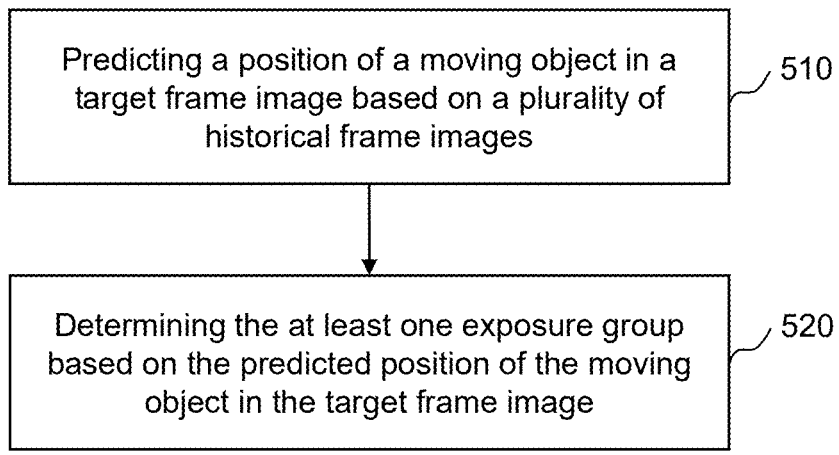
FIG. 5 is a flowchart illustrating an exemplary process for determining at least one exposure group according to some embodiments of the present disclosure.

FIG. 5 is a flowchart illustrating an exemplary process for determining at least one exposure group according to some embodiments of the present disclosure.

In some embodiments, the process 500 may be executed by the image acquisition system 100. For example, the process 500 may be implemented as a set of instructions (e.g., an application) stored in a storage device. The operations of the illustrated process presented below are intended to be illustrative. In some embodiments, the process 500 may be accomplished with one or more additional operations not described and/or without one or more of the operations discussed. Additionally, the order of the operations of process 500 illustrated in FIG. 5 and described below is not intended to be limiting.

In 510, the processing device 110 (e.g., the determination module) may predict a position of a moving object in a target frame image based on a plurality of historical frame images. the target frame image may be generated based on the exposure instruction. The target frame image may also be referred to as a current frame image acquired by the image sensors according to the exposure instruction.

As used herein, a historical frame image refers to an image that is acquired earlier than the target frame image. In some embodiments, the historical frame image may be generated based on a historical exposure instruction. A historical exposure instruction refers to an exposure instruction previously issued by the processing device 110.

In some embodiments, a scene captured by a plurality of image sensors may include a moving object. The determination module of the processing device 110 may predict the position of the moving object in the target frame image. In some embodiments, the determining module may predict the position of the moving object in the target frame image based on the plurality of historical frame images.

In some embodiments, the determination module may identify positions of the moving object in the plurality of historical frame images. The determination module may predict the position of the moving object in the target frame image based on the positions of the moving object in the plurality of historical frame images using a fitting algorithm. Exemplary fitting algorithms may include a least squares curve fitting algorithm, a polynomial fitting algorithm, or the like.

In some embodiments, the position of the ghosting may be near the moving object. The processing device 110 may predict the position of the moving object based on the position of the ghosting. In some embodiments, the determination module may identify positions of the ghosting in the plurality of historical frame images. The determination module may predict the position of the ghosting in the target frame image based on the positions of the ghosting in the plurality of historical frame images using the fitting algorithm. Further, the determining module may predict the position of the moving object in the target frame image according to a preset rule and the position of the ghosting. The preset rule may indicate that the position of the moving object is within a preset range near the ghosting.

In some embodiments, the determination module may identity the position of the moving object and/or the ghosting in the plurality of historical frame images in various manners. For example, for each first pixel of a historical frame image, the determining module may determine a difference between a pixel value of the first pixel and a pixel value of a second pixel corresponding to the first pixel in an adjacent historical frame image. If a position of a first pixel in the historical frame image is the same as a position of a second pixel in the adjacent historical frame image, the second pixel may be referred to as a second pixel corresponding to the first pixel. If a difference between a pixel value of a first pixel and a pixel value of a second pixel corresponding to the first pixel is greater than a preset threshold, it may indicate that the first pixel is in the position of the moving object or the position of the ghosting.

In some embodiments, the determination model may process the plurality of historical frame images using a prediction model to determine the position of the moving object in the target frame image. The prediction model may include an image feature extraction layer and a time sequence layer. An input of the image feature extraction layer may be the plurality of historical frame images, and an output of the image feature extraction layer may be image features of each of the plurality of historical frame images. An input of the time sequence layer may be the image features of the plurality of historical frame images arranged in chronological order, and the time sequence layer may output the position of the moving object in the target frame image. Exemplary image feature extraction layers may include a deep neural network (DNN) layer, a convolutional neural network (CNN) layer, etc. Exemplary time sequence layers may include a recurrent neural network (RNN) layer, a long short-term memory (LSTM) layer, etc.

In some embodiments, the processing device 110 may obtain the prediction model from one or more components of the image acquisition system 100 or an external source via a network. For example, the prediction model may be previously trained by a computing device (e.g., the processing device 110), and stored in a storage device of the image acquisition system 100. The processing device 110 may access the storage device and retrieve the prediction model. In some embodiments, the prediction model may be generated according to a supervised learning algorithm by the processing device 110 or another computing device (e.g., a computing device of a vendor of the prediction model).

Merely by way of example, the processing device 110 may obtain one or more training samples and a preliminary model. Each training sample may include a plurality of sample frame images including a sample moving object, and an actual position of the sample moving object in a sample frame image that is acquired later than the plurality of sample frame images.

In 520, the processing device 110 (e.g., the determination module) may determine the at least one exposure group based on the predicted position of the moving object in the target frame image.

In some embodiments, each of the at least one exposure group may be a target exposure group described in FIG. 2. The at least one exposure group may be associated with the position of the moving object.

In some embodiments, the determining module may determine the target exposure group based on an exposure region that overlaps or is close to the position of the moving object in the target frame image. For example, if the moving object is in the upper half of the target frame image, an exposure group corresponding to the upper half of the target frame image may be determined as the target exposure group.

In some embodiments, the target exposure group may be determined based on one or more other factors. For example, the target exposure group may be determined based on a type of the partial exposure mode. As another example, a count of at least one exposure group may be determined based on a total length of exposure time period of each of the plurality of image sensors.

In some embodiments, the exposure instruction sent by the control module may include the exposure region that overlaps or is close to the position of the moving object in the target frame image, and an adjustment strategy for adjusting an exposure time period of the exposure region. When the plurality of image sensors receive the exposure instruction to perform imaging, a relationship between midpoints of exposure time periods of the exposure group corresponding to the exposure region may satisfy a condition. In this way, the ghosting is not be concentrated in the position of the moving object in the target frame image, but may be evenly distributed in different positions, which may reduce the influence of the ghosting on the quality of the target frame image. When midpoints of the exposure time periods of all the exposure regions cannot be adjusted to coincide, the processing device 110 may adjust the midpoints of the exposure time periods of the exposure regions associated with the moving object to coincide by controlling the exposure time periods corresponding to the exposure group associated with the moving object, thereby improving the display effect of the ghosting of the moving object.

Figure 6:
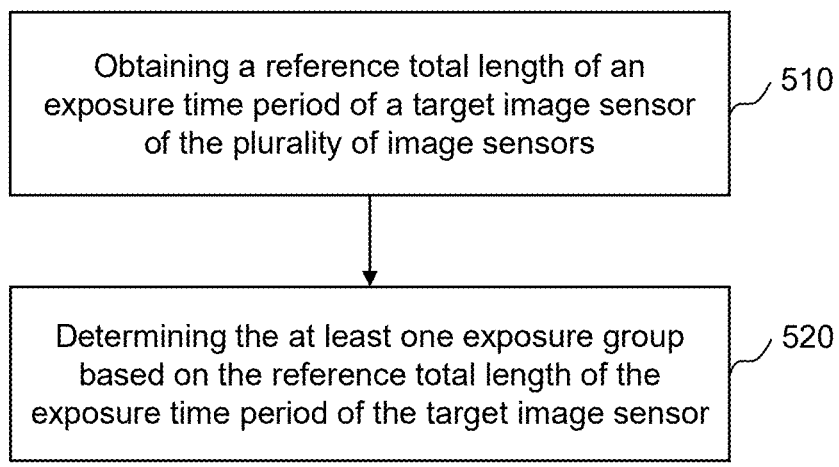
FIG. 6 is a flowchart illustrating an exemplary process for determining at least one exposure group according to some embodiments of the present disclosure.

FIG. 6 is a flowchart illustrating an exemplary process for determining at least one exposure group according to some embodiments of the present disclosure.

In some embodiments, the process 600 may be executed by the image acquisition system 100. For example, the process 600 may be implemented as a set of instructions (e.g., an application) stored in a storage device. The operations of the illustrated process presented below are intended to be illustrative. In some embodiments, the process 600 may be accomplished with one or more additional operations not described and/or without one or more of the operations discussed. Additionally, the order of the operations of process 600 illustrated in FIG. 6 and described below is not intended to be limiting.

In 610, the processing device 110 may obtain a reference total length of exposure time periods of a target image sensor of the plurality of image sensors.

As used herein, the target image sensor refers to an image sensor whose total length of exposure time periods needs to be controlled. The target image sensor may be one or more of a plurality of image sensors. In some embodiments, the target image sensor may be an image sensor whose total length of the exposure time periods is less than a threshold among the plurality of image sensors.

In some embodiments, the total length of the exposure time period s of the target image sensor the refers to a length of time during which a whole of an imaging region in the target image sensor is exposed. The total length of the exposure time periods of the target image sensor may be determined based on an exposure starting time of the first exposure and an exposure ending time of the last exposure of the target image sensor.

In some embodiments, the processing device 110 may obtain the reference total length of the exposure time periods of the target image sensor in various manners. For example, the processing device 110 may obtain the reference total length of the exposure time periods of the target image sensor from a storage device of the capture device 120. As another example, the processing device 110 may determine the reference total length of the exposure time periods of the target image sensor based on length of exposure time periods of each exposure of the target image sensor according to a preset rule.

According to the preset rule, a relationship between the length of the exposure time periods of each exposure and the total length of the exposure time periods of the target image sensor may be a linear or non-linear relationship.

In 620, the processing device 110 may determine the at least one exposure group based on the reference total length of the exposure time periods of the target image sensor.

In some embodiments, each of the at least one exposure group may be a target exposure group described in FIG. 2.

In some embodiments, the processing device 110 may determine that the exposure starting times of exposure time periods of a plurality of exposure regions in each of the at least one exposure group needs to be delayed or advanced by a time difference, so that a relationship between midpoints of the exposure time periods of the plurality of exposure regions in the exposure group satisfies a condition. More descriptions for the delaying or advancing the exposure starting times of exposure time periods may be found elsewhere in the present disclosure (e.g., FIG. 3 and the descriptions thereof).

In some embodiments, the processing device 110 may determine a maximum number of the at least one exposure group that can satisfy the condition when the total length of exposure time periods of the target image sensor is smaller than the reference total length of exposure time periods of the target image sensor based on exposure time periods of a plurality of exposure regions corresponding to the target image sensor. For example, the processing device 110 may determine the time difference that each exposure time period corresponding to the target image sensor needs to be delayed or advanced based on the exposure time periods of the multiple exposure regions corresponding to a reference image sensor and the target image sensor. Further, the maximum number of the at least one exposure group may be determined based on each exposure time period corresponding to the target image sensor and the time difference that each exposure time period corresponding to the target image sensor needs to be delayed or advanced. For example, the processing device 110 may update each exposure time period corresponding to the target image sensor based on each exposure time period corresponding to the target image sensor and the time difference that each exposure time period corresponding to the target image sensor needs to be delayed or advanced to obtain the updated exposure time periods corresponding to the target image sensor. The processing device 110 may determine a maximum number of one or more of the updated exposure time periods that make the total length of the one or more of the updated exposure time periods less than the reference total length of the exposure time periods of the target image sensor. Further, the processing device 110 may designate the maximum number of one or more of the updated exposure time periods as the maximum number of the at least one exposure group.

In some embodiments, the processing device 110 may determine the at least one exposure group based on the maximum number of the at least one exposure group. For example, the processing device 110 may select x exposure groups from all target exposure groups, and x is smaller than or equal to the maximum number. In some embodiments, the processor may select x exposure groups from all target exposure groups based on the position of the moving object described in FIG. 5. For example, the exposure regions in the x exposure groups may include the position of the moving object in the target frame image.

In some embodiments, the exposure instruction sent by the control module may include the selected x exposure groups and adjustment strategies of exposure time periods of the selected x exposure groups. When the plurality of image sensors receive the exposure instruction to perform imaging, the midpoints of the exposure time periods corresponding to the selected x exposure groups satisfy the condition. In some embodiments, the condition may be satisfied in response to a distance between the midpoints of exposure time periods of the plurality of exposure regions in the exposure group being smaller than or equal to a threshold.

In some cases, a total length of exposure time period of an image sensor may be limited. For example, when the exposure of the image sensor needs to use a flashlight for shooting, the total length of the exposure time period of the image sensor is relatively short. The processing device 110 may determine one or more target exposure groups based on the total length of the exposure time period of the image sensor, which can not only meet the needs of the actual scene, but also control the ghosting not to be concentrated in one place, thereby improving the quality of the image acquired by the plurality of image sensors.

Figure 8:
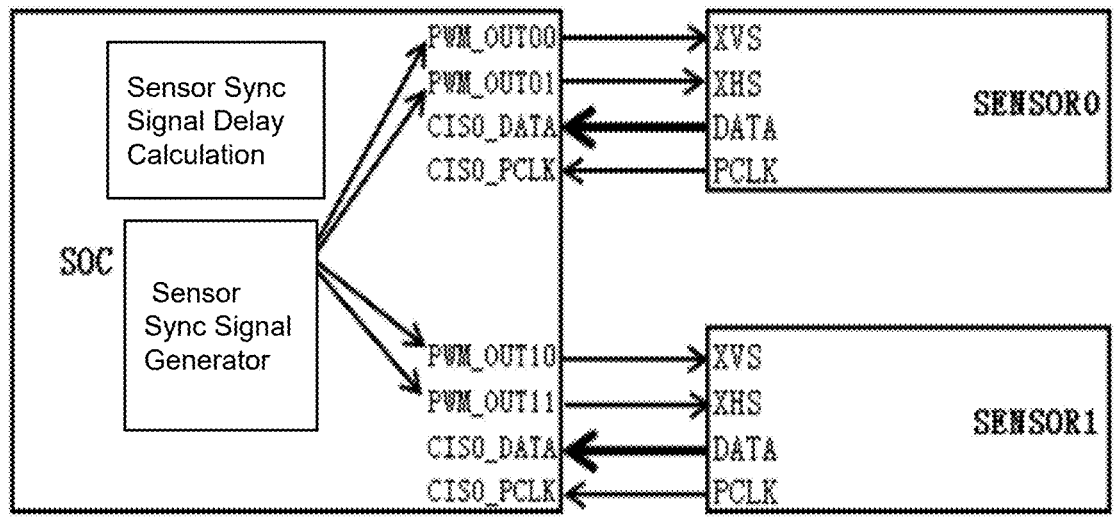
FIG. 8 is a schematic diagram illustrating an exemplary capture device 800 according to some embodiments of the present disclosure.

FIG. 7 is a flowchart illustrating an exemplary process 700 for image acquisition according to some embodiments of the present disclosure. FIG. 8 is a schematic diagram illustrating an exemplary capture device 800 according to some embodiments of the present disclosure.

In some embodiments, the process 700 may be executed by the image acquisition system 100. For example, the process 700 may be implemented as a set of instructions (e.g., an application) stored in a storage device. The operations of the illustrated process presented below are intended to be illustrative. In some embodiments, the process 700 may be accomplished with one or more additional operations not described and/or without one or more of the operations discussed. Additionally, the order of the operations of process 700 illustrated in FIG. 7 and described below is not intended to be limiting.

In 710, the processing device 110 may obtain a first image captured by a first image sensor of a capture device and a second image captured by a second image sensor of the capture device.

As shown in FIG. 8, the capture device 800 may include at least a system on chip (SOC), the first image sensor sensor0, and the second image sensor sensor1.

Alternatively, the SOC may also be replaced by a pulse width modulation (PWM). During the image acquisition process, the SOC may generate a frame synchronization signal XVS0 and a row synchronization signal XHS0, which may be output to sensor0 to generate a XVS1 and a XHS1. The XVS1 and a XHS1 may be output to the sensor1. The first image sensor and the second image sensor start photosensitive work according to the frame synchronization signal and the row synchronization signal to perform image acquisition, respectively. Specifically, the first image sensor of the capture device 800 may capture the first image and the second image sensor of the capture device 800 may capture the second image.

Further, before the first image and the second image are captured, the capture device 800 needs to be initialized. Specifically, the first image sensor and the second image sensor may be connected to the SOC hardware, and the first image sensor and the second image sensor may be set to a slave mode. According to work needs, a high or low level configuration corresponding to the synchronization signals XVS0 and XHS0 of the first image sensor and a high and low level configuration corresponding to the synchronization signals XVS1 and XHS1 of the second image sensor may be set. Delay times of the first image sensor and the second image sensor may be set to zero. The delay time of the first image sensor refers to a time of a first exposure time period of the first image sensor needs to be delayed. The delay time of the second image sensor refers to a time of a second exposure time period of the second image sensor needs to be delayed.

In 720, the processing device 110 may determine a first exposure period based on the first image and a second exposure period based on the second image.

In some embodiments, after the first image and the second image are captured, the processing device 110 may perform an exposure processing on the first image and the second image to obtain a first exposure time period texp0 when the first image sensor captures the first image and a second exposure time period texp1 when the second sensor captures the second image.

In 730, the processing device 110 may generate a sensor synchronization signal based on the first exposure time period and the second exposure time period.

In some embodiments, the processing device 110 may generate the sensor synchronization signal based on a time difference between the first exposure time and the second exposure time. The sensor synchronization signal may be used to adjust a time of the first exposure time period of the first image sensor needs to be delayed (i.e., the delay time of the first image sensor) and/or a time of the second exposure time period of the second image sensor needs to be delayed (i.e., the delay time of the second image sensor), so that midpoints of the first exposure time period of the first image sensor and the second exposure time period of the second image sensor may coincide.

Figure 9:
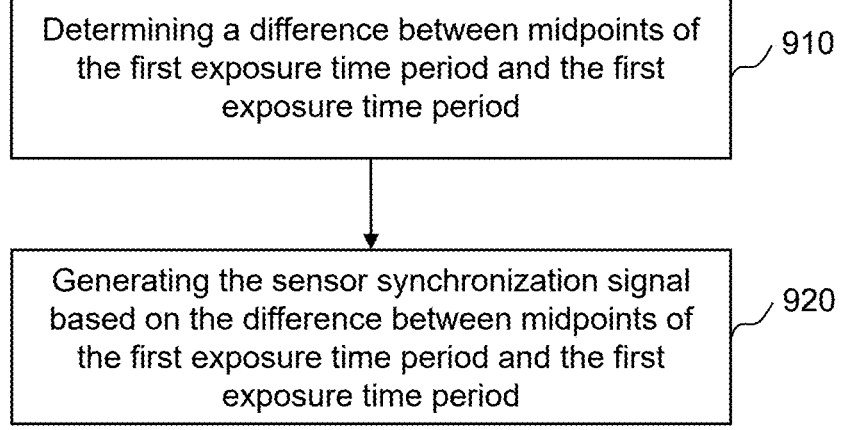
FIG. 9 is a flowchart illustrating an exemplary process for generating a sensor synchronization signal based on the first exposure time period and the second exposure time period according to some embodiments of the present disclosure.
Figure 10:
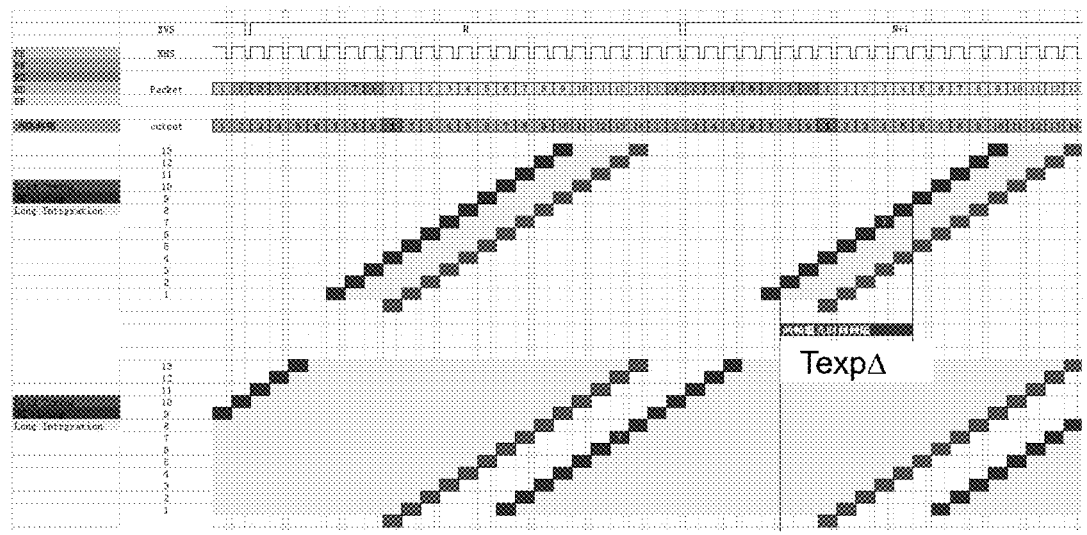
FIG. 10 is a schematic diagram illustrating an exemplary exposure time sequence in which midpoints of exposure time periods do not coincide according to some embodiments of the present disclosure.
Figure 11:
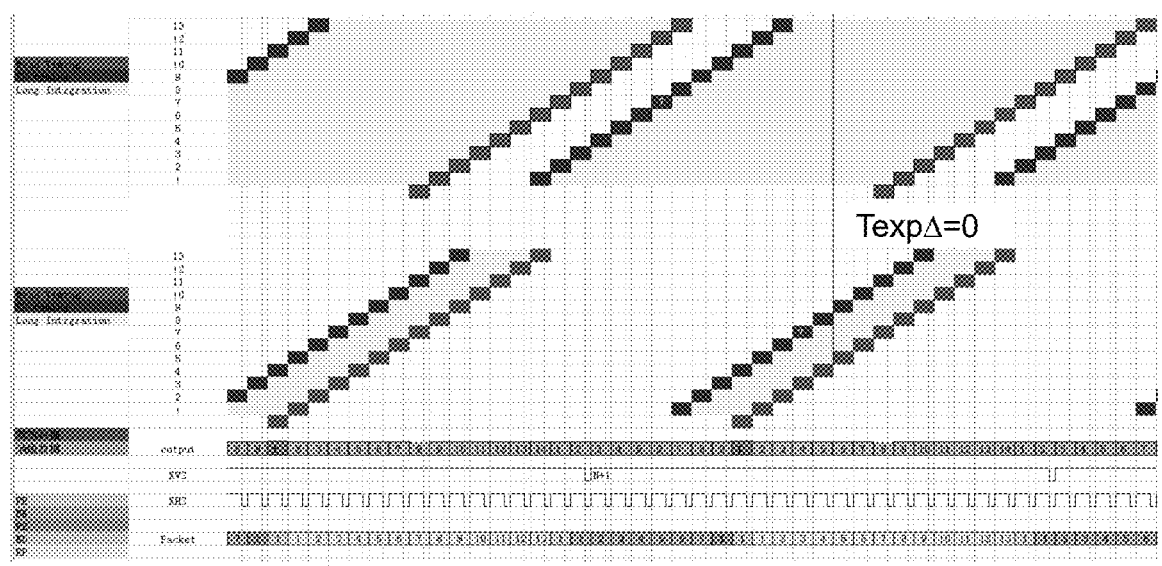
FIG. 11 is a schematic diagram illustrating an exemplary exposure time sequence in which midpoints of exposure time periods coincide according to some embodiments of the present disclosure.

FIG. 9 is a flowchart illustrating an exemplary process 900 for generating a sensor synchronization signal based on the first exposure time period and the second exposure time period according to some embodiments of the present disclosure. In some embodiments, one or more operations of the process 900 may be performed to achieve at least part of operation 730 as described in connection with FIG. 7. FIG. 10 is a schematic diagram illustrating an exemplary exposure time sequence in which midpoints of exposure time periods do not coincide according to some embodiments of the present disclosure. FIG. 11 is a schematic diagram illustrating an exemplary exposure time sequence in which midpoints of exposure time periods coincide according to some embodiments of the present disclosure.

In 910, the processing device 110 may determine a difference between midpoints of the first exposure time period and the first exposure time period.

In some embodiments, if the synchronization signal XVS0 of the first image sensor is designated as a reference synchronization signal, the processing device 110 may determine the difference between the midpoints of the first exposure time period of the first image sensor and the second exposure time period of the second image sensor according to Equation (1) as below:

$$Texp\Delta = (Texp1 - Texp0)/2, \quad (1)$$

Where TexpA denotes the difference between the midpoints of the first exposure time period and the second exposure time period, Texp0 denotes the first exposure time period, and Texp1 denotes the first exposure time period. The Equation (1) may indicate that the difference between the midpoints of the first exposure time period of the first image sensor and the second exposure time period of the second image sensor is TexpA if the XVS0 of the first image sensor is synchronized with XVS1 of the second image sensor.

In 920, the processing device 110 may generate the sensor synchronization signal based on the difference between midpoints of the first exposure time period and the first exposure time period.

In some embodiments, as shown in FIG. 10, TexpA does not equal 0, it indicates that the midpoints of the first exposure time period of the first image sensor and the second exposure time period of the second image sensor does not coincide. If TexpA is greater than 0, it indicates that in order to ensure that the midpoints of the first exposure time period of the first image sensor and the second exposure time period of the second image sensor coincide, XVS1 needs to be delayed by TexpA compared to XVS0. If TexpA is less than 0, it indicates that in order to ensure that the midpoints of the first exposure time period of the first image sensor and the second exposure time period of the second image sensor coincide, XVS1 needs to be advanced by TexpA compared to XVS0.

In some embodiments, as shown in FIG. 11, TexpA equals 0, it indicates that the midpoints of the first exposure time period of the first image sensor and the second exposure time period of the second image sensor coincide.

Figure 12A:
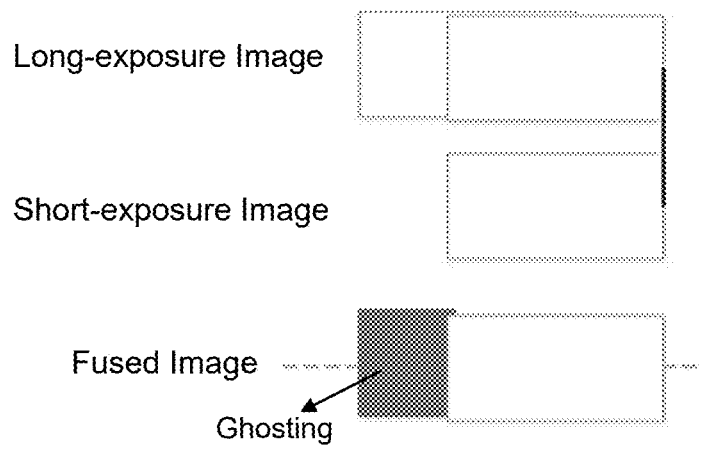
FIG. 12A is a schematic diagram illustrating exemplary images captured by a first image sensor and a second image sensor according to some embodiments of the present disclosure.

For example, FIG. 12A is a schematic diagram illustrating exemplary images captured by a first image sensor and a second image sensor according to some embodiments of the present disclosure. As shown in FIG. 12A, exposure ending times corresponding to a long-exposure image captured by the first image sensor and a short-exposure image captured by the second image sensor are the same, that is, midpoints of the exposure time period corresponding to the long-exposure image and the exposure time period corresponding to the short-exposure image coincide does not coincide. In this case, the ghosting caused by a moving object in an image fused by the long-exposure image and the short-exposure image is concentrated on one side of the fused image, which reduces the imaging effect of the moving object.

Figure 12B:
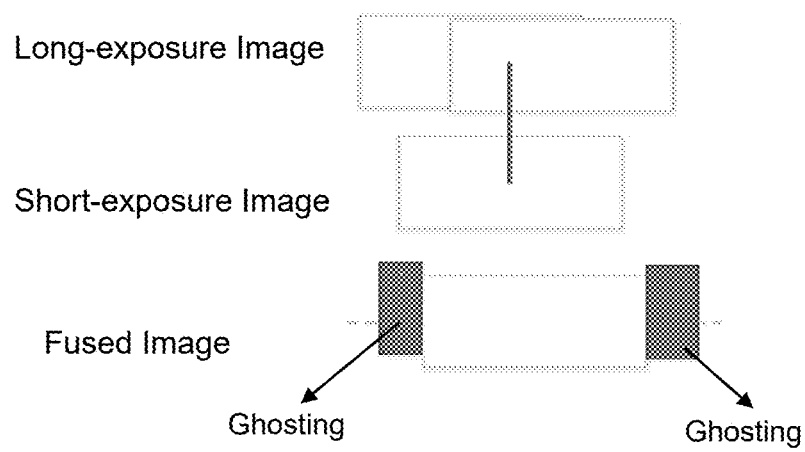
FIG. 12B is a schematic diagram illustrating exemplary images captured by a first image sensor and a second image sensor according to some embodiments of the present disclosure.

For example, FIG. 12B is a schematic diagram illustrating exemplary images captured by a first image sensor and a second image sensor according to some embodiments of the present disclosure. As shown in FIG. 12B, the midpoints of the exposure time period corresponding to the long-exposure image and the exposure time period corresponding to the short-exposure image coincide. In this case, the ghosting caused by a moving object in an image fused by the long-exposure image and the short-exposure image is evenly distributed to both sides of the fused image, which may effectively improve the imaging effect of the moving object.

In 740, the processing device 110 may adjust the delay time of the first image sensor and/or the delay time of the second image sensor based on the sensor synchronization signal to obtain adjusted exposure time periods corresponding to the first image sensor and the second image sensor, so that the first image sensor and/or the second image sensor may capture images based on the adjusted exposure time periods.

In some embodiments, the processing device 110 may output the adjusted exposure time periods and the synchronization signal to the first image sensor and/or the image second sensor based on the sensor synchronization signal, respectively, so that the first image sensor and/or the second image sensor start the photosensitive work and perform image acquisition according to the adjusted exposure time periods and the synchronization signal. For example, the processing device 110 may designate the frame synchronization signal of the first image sensor as a reference synchronization signal, and then adjust the delay time of the second sensor based on the sensor synchronization signal.

It should be noted that in a video surveillance scene, the environment is generally in a constantly changing, therefore, the image acquisition method of the present disclosure needs to be continuously executed in a loop to continuously adapt to changes in the environment.

For example, after operation 740 is performed, the processing device 110 may continue to perform one or more of the following operations. The processing device 110 may obtain a third image based on the adjusted exposure time period corresponding to the first image sensor by the first image sensor and a fourth image sensor based on the adjusted exposure time period corresponding to the second image sensor by the second image. The processing device 110 may also determine a third exposure time period and the fourth exposure time based on the third image and the fourth image, respectively. The processing device 110 may also determine whether a difference between midpoints of the third exposure time period and the fourth exposure time period equals 0. In response to determine that the difference between midpoints of the third exposure time period and the fourth exposure time period equals 0, it indicates that the first image sensor and the second image sensor may capture images according to the adjusted exposure time periods. In response to determine that the difference between midpoints of the third exposure time period and the fourth exposure time period does not equal 0, the processing device 110 may determine the difference between midpoints of the third exposure time period and the fourth exposure time period, and adjust the delay time of the first image sensor and/or the delay time of the second image sensor based on the difference between midpoints of the third exposure time period and the fourth exposure time period.

According to some embodiments of the present disclosure, the processing device 110 may obtain the first image captured by the first image sensor and the second image captured by the second image sensor, and determine the first exposure period based on the first image and the second exposure period based on the second image. Further, the processing device 110 may generate the sensor synchronization signal based on the first exposure time period and the second exposure time period, and adjust the delay time of the first image sensor and/or the delay time of the second image sensor based on the sensor synchronization signal to obtain adjusted exposure time periods corresponding to the first image sensor and the second image sensor, so that the first image sensor and/or the second image sensor may capture images based on the adjusted exposure time periods. In this way, a quality of an image fused by the first image captured by the first image sensor and the second image captured by the second image sensor may be effectively improved.

It will be apparent to those skilled in the art that various changes and modifications can be made in the present disclosure without departing from the spirit and scope of the disclosure. In this manner, the present disclosure may be intended to include such modifications and variations if the modifications and variations of the present disclosure are within the scope of the appended claims and the equivalents thereof.

Having thus described the basic concepts, it may be rather apparent to those skilled in the art after reading this detailed disclosure that the foregoing detailed disclosure is intended to be presented by way of example only and is not limiting. Various alterations, improvements, and modifications may occur and are intended to those skilled in the art, though not expressly stated herein. These alterations, improvements, and modifications are intended to be suggested by this disclosure, and are within the spirit and scope of the exemplary embodiments of this disclosure.

Moreover, certain terminology has been used to describe embodiments of the present disclosure. For example, the terms "one embodiment," "an embodiment," and/or "some embodiments" mean that a particular feature, structure or characteristic described in connection with the embodiment is included in at least one embodiment of the present disclosure. Therefore, it is emphasized and should be appreciated that two or more references to "an embodiment" or "one embodiment" or "an alternative embodiment" in various portions of this specification are not necessarily all referring to the same embodiment. Furthermore, the particular features, structures or characteristics may be combined as suitable in one or more embodiments of the present disclosure.

Further, it will be appreciated by one skilled in the art, aspects of the present disclosure may be illustrated and described herein in any of a number of patentable classes or context including any new and useful process, machine, manufacture, or combination of matter, or any new and useful improvement thereof. Accordingly, aspects of the present disclosure may be implemented entirely hardware, entirely software (including firmware, resident software, micro-code, etc.) or combining software and hardware implementation that may all generally be referred to herein as a "unit," "module," or "system." Furthermore, aspects of the present disclosure may take the form of a computer program product embodied in one or more computer readable media having computer-readable program code embodied thereon.

A computer readable signal medium may include a propagated data signal with computer readable program code embodied therein, for example, in baseband or as part of a carrier wave. Such a propagated signal may take any of a variety of forms, including electromagnetic, optical, or the like, or any suitable combination thereof. A computer readable signal medium may be any computer readable medium that is not a computer readable storage medium and that may communicate, propagate, or transport a program for use by or in connection with an instruction execution system, apparatus, or device. Program code embodied on a computer readable signal medium may be transmitted using any appropriate medium, including wireless, wireline, optical fiber cable, RF, or the like, or any suitable combination of the foregoing.

Computer program code for carrying out operations for aspects of the present disclosure may be written in a combination of one or more programming languages, including an object oriented programming language such as Java, Scala, Smalltalk, Eiffel, JADE, Emerald, C++, C#, VB. NET, Python or the like, conventional procedural programming languages, such as the "C" programming language, Visual Basic, Fortran 2003, Perl, COBOL 2002, PHP, ABAP, dynamic programming languages such as Python, Ruby, and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (Saas).

Furthermore, the recited order of processing elements or sequences, or the use of numbers, letters, or other designations thereof, are not intended to limit the claimed processes and methods to any order except as may be specified in the claims. Although the above disclosure discusses through various examples what is currently considered to be a variety of useful embodiments of the disclosure, it is to be understood that such detail is solely for that purpose, and that the appended claims are not limited to the disclosed embodiments, but, on the contrary, are intended to cover modifications and equivalent arrangements that are within the spirit and scope of the disclosed embodiments. For example, although the implementation of various components described above may be embodied in a hardware device, it may also be implemented as a software only solution, e.g., an installation on an existing server or mobile device.

Similarly, it should be appreciated that in the foregoing description of embodiments of the present disclosure, various features are sometimes grouped together in a single embodiment, figure, or description thereof for the purpose of streamlining the disclosure aiding in the understanding of one or more of the various embodiments. This method of disclosure, however, is not to be interpreted as reflecting an intention that the claimed subject matter requires more features than are expressly recited in each claim. Rather, claimed subject matter may lie in less than all features of a single foregoing disclosed embodiment.

What is claimed is:

1. A system for image acquisition, comprising:
at least one storage device including a set of instructions; and
at least one processor in communication with the at least one storage device, wherein when executing the set of instructions, the at least one processor is directed to cause the system to perform operations including:
sending an exposure instruction to a plurality of image sensors; and
controlling, based on the exposure instruction, exposure time periods of at least one exposure group to obtain a plurality of frame images, wherein, for each of the at least one exposure group,
the exposure group includes a plurality of exposure regions corresponding to the plurality of image sensors, wherein
each of the plurality of exposure regions of the exposure group covers a portion of an imaging region of an image sensor corresponding to the exposure region; and
imaging positions corresponding to the at least one exposure group covers a whole of the imaging region of the image sensor;
imaging positions corresponding to the plurality of exposure regions are the same; and
the exposure instruction causes that a relationship between midpoints of exposure time periods of the plurality of exposure regions in the exposure group satisfies a condition.

2. The system of claim 1, wherein the condition is satisfied in response to a distance between the midpoints of exposure time periods of the plurality of exposure regions in the exposure group being smaller than or equal to a threshold.

3. The system of claim 1, wherein each of the plurality of exposure regions of the exposure group covers a whole of an imaging region of an image sensor corresponding to the exposure region.

4. The system of claim 1, wherein delay time differences of a plurality of exposure time sequences corresponding to the plurality of image sensors are the same, wherein, for each of the plurality of image sensors,
an exposure time sequence corresponding to the image sensor is determined based on an arrangement of exposure starting times of a plurality of exposure regions corresponding to the image sensor; and
a delay time difference of the exposure time sequence is determined based on a difference between two adjacent exposure starting times in the exposure time sequence corresponding to the image sensor.

5. The system of claim 1, wherein the at least one exposure group is associated with a moving object.

6. The system of claim 5, wherein the at least one processor is directed to cause the system to further perform operations including:
predicting a position of the moving object in a target frame image based on a plurality of historical frame images, wherein the target frame image is generated based on the exposure instruction; and
determining the at least one exposure group based on the position of the moving object.

7. The system of claim 1, wherein the at least one processor is directed to cause the system to further perform operations including:
obtaining a reference total length of an exposure time period of a target image sensor of the plurality of image sensors; and
determining the at least one exposure group based on the reference total length of the exposure time period of the target image sensor.

8. A method for image acquisition, the method being implemented on a computing device having at least one storage device and at least one processor, the method comprising:
sending an exposure instruction to a plurality of image sensors; and
controlling, based on the exposure instruction, exposure time periods of at least one exposure group to obtain a plurality of frame images, wherein, for each of the at least one exposure group,
the exposure group includes a plurality of exposure regions corresponding to the plurality of image sensors, wherein
each of the plurality of exposure regions of the exposure group covers a portion of an imaging region of an image sensor corresponding to the exposure region; and
imaging positions corresponding to the at least one exposure group covers a whole of the imaging region of the image sensor;
imaging positions corresponding to the plurality of exposure regions are the same; and
the exposure instruction causes that a relationship between midpoints of exposure time periods of the plurality of exposure regions in the exposure group satisfies a condition.

9. The method of claim 8, wherein the condition is satisfied in response to a distance between the midpoints of exposure time periods of the plurality of exposure regions in the exposure group being smaller than or equal to a threshold.

10. The method of claim 8, wherein each of the plurality of exposure regions of the exposure group covers a whole of an imaging region of an image sensor corresponding to the exposure region.

11. The method of claim 8, wherein delay time differences of a plurality of exposure time sequences corresponding to the plurality of image sensors are the same, wherein, for each of the plurality of image sensors,
an exposure time sequence corresponding to the image sensor is determined based on an arrangement of exposure starting times of a plurality of exposure regions corresponding to the image sensor; and
a delay time difference of the exposure time sequence is determined based on a difference between two adjacent exposure starting times in the exposure time sequence corresponding to the image sensor.

12. The method of claim 8, wherein the at least one exposure group is associated with a moving object.

13. The method of claim 12, wherein the method further comprises:
predicting a position of the moving object in a target frame image based on a plurality of historical frame images, wherein the target frame image is generated based on the exposure instruction; and
determining the at least one exposure group based on the position of the moving object.

14. The method of claim 8, wherein the method further comprises:
- obtaining a reference total length of an exposure time period of a target image sensor of the plurality of image sensors; and
- determining the at least one exposure group based on the reference total length of the exposure time period of the target image sensor.

15. A non-transitory computer readable medium, comprising at least one set of instructions for image acquisition, wherein when executed by one or more processors of a computing device, the at least one set of instructions causes the computing device to perform a method, the method comprising:
- sending an exposure instruction to a plurality of image sensors; and
- controlling, based on the exposure instruction, exposure time periods of at least one exposure group to obtain a plurality of frame images, wherein, for each of the at least one exposure group,
  the exposure group includes a plurality of exposure regions corresponding to the plurality of image sensors, wherein
    each of the plurality of exposure regions of the exposure group covers a portion of an imaging region of an image sensor corresponding to the exposure region; and
    imaging positions corresponding to the at least one exposure group covers a whole of the imaging region of the image sensor;
  imaging positions corresponding to the plurality of exposure regions are the same; and
  the exposure instruction causes that a relationship between midpoints of exposure time periods of the plurality of exposure regions in the exposure group satisfies a condition.

* * * * *